(12) United States Patent
Westermann et al.

(10) Patent No.: US 6,263,538 B1
(45) Date of Patent: Jul. 24, 2001

(54) CONNECTING ELEMENT FOR CONNECTING A WINDSCREEN BLADE TO A WIPER ARM HOOK

(75) Inventors: Klaus-Juergen Westermann, Karlsbad; Juergen Mayer, Gaggenau, both of (DE); Peter Wijnants, Wezemool; Jurgens Roekens, Steenokkerzeel, both of (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/380,221

(22) PCT Filed: Dec. 18, 1998

(86) PCT No.: PCT/DE98/03720
§ 371 Date: Oct. 25, 1999
§ 102(e) Date: Oct. 25, 1999

(87) PCT Pub. No.: WO99/35015
PCT Pub. Date: Jul. 15, 1999

(30) Foreign Application Priority Data
Dec. 30, 1997 (DE) .............................. 197 58 245

(51) Int. Cl.$^7$ ...................................... B60S 1/40
(52) U.S. Cl. ......................................... 15/250.32
(58) Field of Search ................ 15/250.32, 250.43, 15/250.44, 250.361, 250.31

(56) References Cited

U.S. PATENT DOCUMENTS 4,443,907 * 4/1984 Chamberlain ................ 15/250.32
5,611,103 * 3/1997 Lee ............................ 15/250.02

FOREIGN PATENT DOCUMENTS

| 85 09 539 | 8/1985 | (DE) . |
| 655373 * | 5/1995 | (EP) . |
| 2482914 * | 11/1981 | (FR) . |
| 2 487 757 | 2/1982 | (FR) . |
| 2 533 517 | 3/1984 | (FR) . |
| 2 692 537 | 12/1993 | (FR) . |

\* cited by examiner

*Primary Examiner*—Gary K. Graham
(74) *Attorney, Agent, or Firm*—Michael J. Striker

(57) ABSTRACT

The present invention relates to a connecting element (1) for connecting a windshield wiper blade (21) to wiper arm hooks (23, 23.1, 28) of different wiper arm hook widths (B, b) and wiper arm hook depths (W, w), which includes a number of different at least partial contact faces (11, 16, 17, 19, 13, 21, 29) for wiper arm hooks (23, 23.1, 28) with different dimensions, having two housing side walls (2, 3) and a center piece (4) disposed between them, wherein these partial contact faces (11, 16, 17, 19, 13, 21, 29) are disposed on a housing side wall (2, 3) in order to compensate for different wiper arm hook widths (B, b) and are disposed on the center piece (4) in order to compensate for different wiper arm hook depths (W, w), and the partial contact faces (11, 16, 17, 19, 13, 21, 29) permit a reception of at least two different wiper arm hooks (23, 23.1, 28) along mounting axes (15, 20) that are disposed at angles to each other.

8 Claims, 2 Drawing Sheets

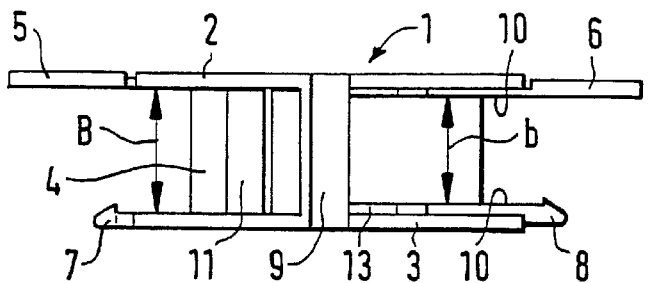
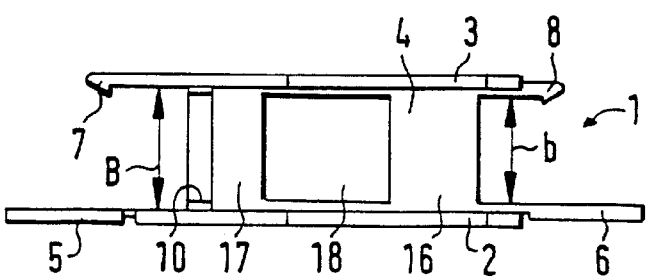
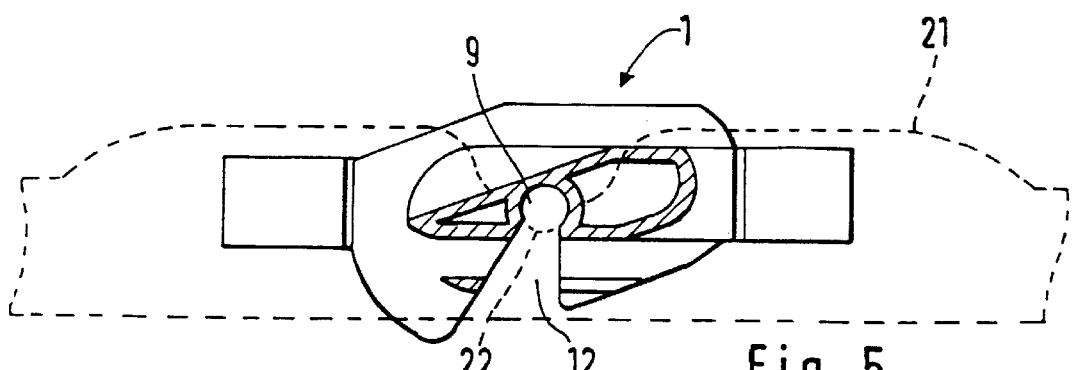

CONNECTING ELEMENT FOR CONNECTING A WINDSCREEN BLADE TO A WIPER ARM HOOK

TECHNICAL FIELD

The invention relates to a connecting element for connecting a windshield wiper blade to a wiper arm hook, wherein the connecting element can be used for different hook widths and hook depths.

PRIOR ART

German Utility Module DE-GM 85 09 539 has disclosed an intermediary connecting element for connecting a windshield wiper blade to a driving lever, which is used for three different hook widths or hook depths and can at the same time be fixed in its position on the hook. To that end, the intermediary connecting element is split in two so that the hook is completely enclosed.

A connecting piece has been disclosed by FR-A1-2 533 517 which can be fastened to two hooks that differ in width and depth.

Furthermore, receptacles are provided for wiper arms without hooks. Here, the disadvantage is that a relatively voluminous component is required.

FR-A1 2 487 757 discloses a connecting element which can be fastened to narrow, deep hooks and to wide, shallower hooks.

FR-A1 2 692 537 discloses another connecting element which can receive a wide, deep hook or a narrower, shallower hook and is then locked onto it.

U.S. Pat. No. 5,084,933 also discloses a connecting element for fastening to a wiper arm, wherein here, however, three different fastening methods are demonstrated, namely hooks, bayonet connection, or pin fastening.

SUMMARY OF THE INVENTION

Through the angular rotation of the two mounting axes, a compact connecting element is produced for different embodiments of wiper arm hooks, which have a different width, but the same hook depth.

Since the connecting element fits different wiper arm hooks, the wiper blade can be provided with the connecting element, which permits an adapter box for a number of connecting elements to be eliminated.

All wiper arm hooks are guided laterally through the housing side walls, wherein according to one modification, the narrower wiper arm hooks are guided by means of contact faces on the insides of the side walls.

In another modification, the locking takes place in the longitudinal direction by means of a film hinge which can be locked behind a detent projection on the opposite side.

BRIEF DESCRIPTION OF THE DRAWINGS

A connecting element according to the invention is shown in the drawings.

FIG. 1 is a bottom view of a connecting element,

FIG. 2 is a longitudinal section through a connecting element,

FIG. 3 is a top view of a connecting element,

FIG. 4 is an end view of the connecting element from FIG. 2,

FIG. 5 shows a connecting element that has been inserted into a wiper blade, in a first position.

PREFERRED EMBODIMENTS

Figure 6:
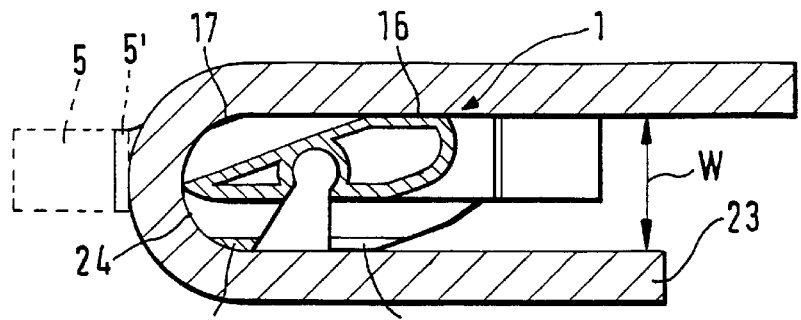
FIG. 6 is a longitudinal section through the connecting element in a wide, deep wiper arm hook.

FIG. 1 shows a view of a connecting element 1 from the bottom. The connecting element 1 has two housing walls 2, 3 disposed opposite each other which are connected to each other by way of a center piece 4. On their ends, the housing side walls 2, 3 have locking means, which are comprised of a film hinge 5, 6 on the housing side wall 2 and detent projections 7, 8 on the opposite housing wall 3. The housing side walls 2, 3 extend laterally away from a central clamping groove 9 for receiving an axis of a wiper blade, wherein because of an additional material support 10, there is a reduction in the distance between the housing side walls 2, 3 from B to b. Furthermore, an intermediary piece 11 that connects the housing side walls 2, 3 is disposed on the one side of the clamping groove 9 and ribs 13 along the housing side wall 2, 3 are disposed on the other side of the clamping groove 9.

In FIG. 2, this intermediary piece 11 is likewise disposed in the lower part, i.e. below the clamping groove 9 for receiving the axis of a wiper blade. The intermediary piece 11, however, extends only to a cutout 12 in the housing side wall 2. On the other side of the cutout 12, only ribs 13 are provided. On the one end, the support 10 transitions into the film hinge 6 and on the other end, it has a contour that corresponds to the internal contour of a hook with the depth W.

The side of the intermediary piece 11 oriented toward the clamping groove 9 and the ribs 13, together with the center piece 4, define a guide channel 14, which is disposed parallel to a longitudinal axis or mounting axis 15 of the connecting element 1. Another stop face 16 on the top side of the center piece 4, together with a guide rib 17, provides for another guidance possibility. Between the guide rib 17 and the support face 16, an opening 18 is disposed, in which the center piece 4 in turn has a guide surface 19, which is disposed offset, parallel to a second mounting axis 20 that is disposed offset in relation to the mounting axis 15 by an angle α. This mounting surface 19 cooperates with an inner surface 21 of the connecting rib 17, which is correspondingly aligned so that it is likewise parallel to the mounting axis 20.

In FIG. 3, the different functioning elements are depicted in a top view of the connecting element 1. The center opening 18 is visible, which is disposed between the support face 16 and the connecting rib 17 on the top side of the center piece 4. The housing side wall 2 is provided with film hinges 5, 6, wherein the film hinge 6 is disposed on a support 10 for reducing the width between the housing side wall 2 and the housing side wall 3. The support 10 extends from the film hinge 6 beyond the connecting rib 17, wherein the center opening 18 has the same width as the distance b between the supports 10 of the housing side walls 2, 3. At each end, the housing side wall 3 has a detent projection 7, 8 which cooperates with the corresponding film hinge 5 or 6.

FIG. 4 shows a view of the end that has the film hinge 6 or the detent projection 8. The center piece 4 is disposed between the housing side walls 2, 3 and the support face 16 is disposed on the top side of the center piece 4. In the lower region, the connecting piece 11 and the guide rib 13 are depicted which, together with the center piece 4, enclose the guide channel 14.

FIG. 5 shows the position of the connecting element 1 on a wiper arm 21. With its clamping groove 9, the connecting element 1 encloses and axle 22 connected to the wiper blade 21, wherein the connecting element 1 is first slid with the cutout 12 onto the axle 22 and then, the axle is clipped into the clamping groove 9 by means of a slight pressure.

FIG. 6 shows the placement of a connecting element 1 in a wide wiper arm hook 23 with a large hook depth W. The connecting element 1 rests with its support face 16, the guide rib 17, and the intermediary piece 11 in the curvature 24 of the wiper arm hook 23. The rib 13 provides an additional guidance. The connecting element 1 is secured against falling out by folding the film hinge 5 over into a position 5'.

Figure 7:
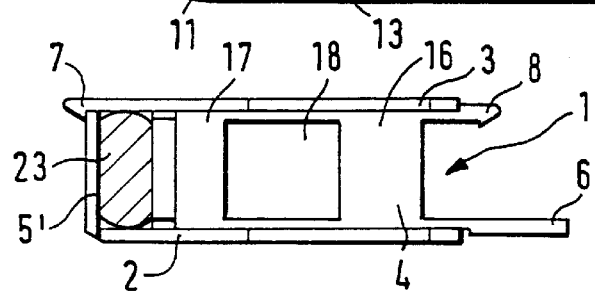
FIG. 7 is a cross section with a partial view of FIG. 6.

FIG. 7 shows the locking of the connecting element 1 around the wiper arm hook 23 with a folded film hinge 5', wherein the film hinge 5' is engaged in detent fashion the underneath the detent projection 7. Otherwise, this embodiment also contains the functional elements known from FIG. 3, which should be referred to for the remainder of their description.

Figure 8:
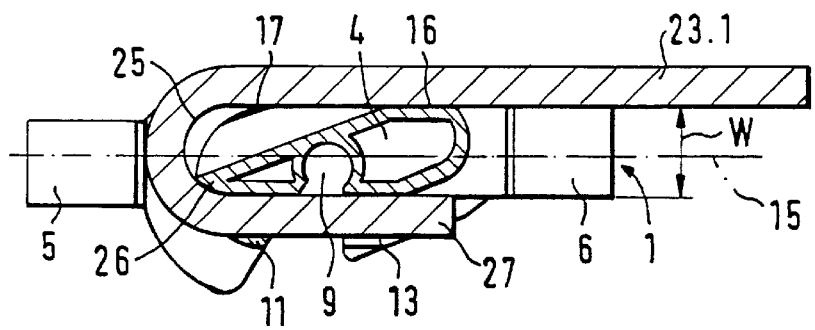
FIG. 8 shows the fastening of the connecting element in a wide, shallower wiper arm hook.

FIG. 8 shows the accommodation of the connecting element 1 in a wiper arm hook 24 of the same width as the wiper arm hook 23 shown in FIGS. 6 and 7, where in contrast to FIG. 6, the wiper arm hook 24 has a reduced hook depth w. The contact of the contact face 16 and the connecting rib 17 against the wiper arm hook 24 is visible here, too. In contrast to the disposition shown in FIG. 6, however, the connecting rib 17 does not nestle against the curvature 25 of the wiper arm hook 24, but is spaced apart from it. The limitation of the axial sliding inside the wiper arm hook is produced by means of the contact of the front part 26 of the center piece 4 against the inner wall of the hook 25. The bent-over end 27 of the wiper arm hook 25 is guided through the channel 14, which is defined by the center piece 4, the intermediary piece 11, and the ribs 13. As a result, the clamping groove 9 is closed off by the end 27 so that in addition, the wiper blade is prevented from falling out of the center piece. In order to fix the axial position of the connecting element 1 in the wiper arm hook 24, the film hinge 5 can once again be folded around the hook 24 and locked in place.

Figure 9:
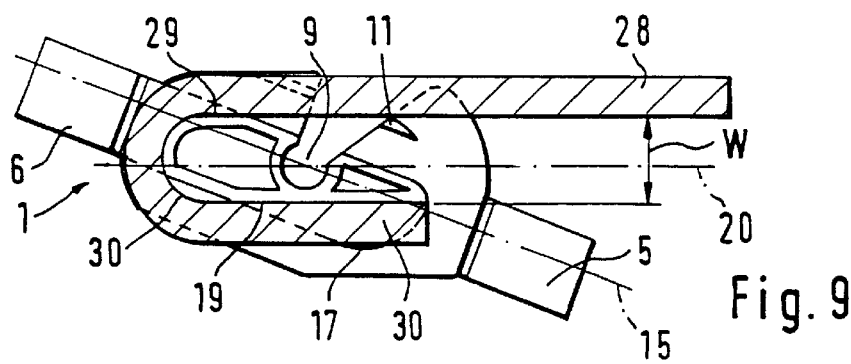
FIG. 9 shows the fastening of the connecting element according to a second mounting axis in a narrower, shallower wiper arm hook.
Figure 10:
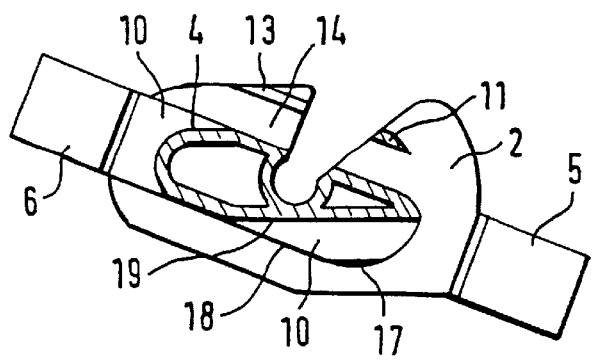
FIG. 10 shows compensation surfaces inside the connecting element.

FIGS. 9 and 10 show and installation variant in a narrower wiper arm hook 28, likewise with the hook depth w. The connecting element 1 is slid into the wiper arm hook 28 in the mirror image, upside-down position, which results in a diagonal alignment off the film hinges 5 and 6 in relation to the wiper arm hook 28. As a result, the installation into the wiper arm hook 28 takes place along the mounting axis 20. The center piece 4 now comes into contact with the guide face 19 and an additional contact face 29 for contact against the inner wall 30 of the hook 28, wherein an end 30 of the hook 28 is guided through the center opening 18, between the support face 19 and the connecting rib 17. In addition to the support face 29, the intermediary piece 11 also comes into contact with the wiper arm hook 28. In order to fix the connecting element 1 in its position, the film hinge 6 is folded over and locked in place. As a result of the inverted disposition of the connecting element 1, the clamping groove 9 opens upward.

FIG. 10 once again shows the compensation surfaces for the reduced width of the wiper arm hook. In this instance, they are comprised of the rib 13 and the support face 10, which is once again also disposed between the connecting rib 17 and the support face 19 in the vicinity of the center opening 18. These regions 10, 13, which are disposed on the housing side wall 2 and protrude beyond it, provide for the lateral guidance of a narrower width wiper arm hook 28 shown in FIG. 9. In this connection, an end 30 of the wiper arm hook 28 protrudes through the center opening 18.

The adapter permits 8×3, 9×3, and 9×4 hooks to be covered.

The connecting element can be used for wiper arm hooks with or without a detent opening, since the position fixing is carried out by means of the film hinge.

What is claimed is:

1. A connecting element (1) for connecting a windshield wiper blade (21) to wiper arm hooks (23, 23.1, 28) of different wiper arm hook widths (B, b) and wiper arm hook depths (W, w), which includes a number of different at least partial contact faces (11, 16, 17, 19, 13, 21, 29) for wiper arm hooks (23, 23.1, 28) with different dimensions, having two housing side walls (2, 3) and a center piece (4) disposed between them, characterized in that these partial contact faces (11, 16, 17, 19, 13, 21, 29) are disposed on the housing side walls (2, 3) in order to compensate for different wiper arm hook widths (B, b) and are disposed on the center piece (4) in order to compensate for different wiper arm hook depths (W, w), and that the partial contact faces (11, 16, 17, 19, 13, 21, 29) permit a reception of at least two different wiper arm hooks (23, 23.1, 28) along mounting axes (15, 20) that are disposed at angles to each other, at least two of the partial contact faces (19, 21) constitute a guide channel.

2. The connecting element according to claim 1, wherein a partial contact face is comprised as a support (10) on the housing side walls (2, 3) and extends at most over a smallest wiper arm hook depth (w), approximately parallel to the wiper arm axis (15).

3. The connecting element according to one claim 1, wherein a number of partial contact faces (19, 19.1, 21) are disposed along a first mounting axis (20) that is offset diagonally from a second mounting axis (15).

4. The connecting element according to claim 1, wherein an intermediary piece (11) and/or a connecting rib (17) are provided, which are disposed spaced apart from the center piece (4) and together with it, define a guide channel (14).

5. A connecting element (1) for connecting a windshield wiper blade (21) to wiper arm hooks (23, 23.1, 28) of different wiper arm hook widths (B, b) and wiper arm hook depths (W, w), which includes a number of different at least partial contact faces (11, 16, 17, 19, 13, 21, 29) for wiper arm hooks (23, 23.1, 28) with different dimensions, having two housing side walls (2, 3) and a center piece (4) disposed between them, these partial contact faces (11, 16, 17, 19, 13, 21, 29) are disposed on a housing side wall (2, 3) in order to compensate for different wiper arm hook widths (B, b) and are disposed on the center piece (4) in order to compensate for different wiper arm hook depths (W, w), and that the partial contact faces (11, 16, 17, 19, 13, 21, 29) permit a reception of at least two different wiper arm hooks (23, 23.1, 28) along mounting axes (15, 20) that are disposed at angles to each other, at least two of the partial contact faces constitute a guide channel, the guide channel extends in a direction of one of the two mounting axes (15, 20) and has a central opening (18) for a wiper arm hook (28) with reduced width (b).

6. A connecting element (1) for connecting a windshield wiper blade (21) to wiper arm hooks (23, 23.1, 28) of different wiper arm hook widths (B, b) and wiper arm hook depths (W, w), which includes a number of different at least partial contact faces (11, 16, 17, 19, 13, 21, 29) for wiper arm hooks (23, 23.1, 28) with different dimensions, having two housing side walls (2, 3) and a center piece (4) disposed between them, these partial contact faces (11, 16, 17, 19, 13, 21, 29) are disposed on a housing side wall (2, 3) in order to compensate for different wiper arm hook widths (B, b) and are disposed on the center piece (4) in order to compensate for different wiper arm hook depths (W, w), and that the partial contact faces (11, 16, 17, 19, 13, 21, 29) permit a reception of at least two different wiper arm hooks (23, 23.1, 28) along mounting axes (15, 20) that are disposed at angles to each other, the center piece (4) has parallel support faces (16, 16.1, 16.2) that are oriented in the direction of one of the two mounting axes (15, 20) and have a distance (w) from one another of a smallest wiper arm hook depth (w).

7. A connecting element (1) for connecting a windshield wiper blade (21) to wiper arm hooks (23, 23.1, 28) of different wiper arm hook widths (B, b) and wiper arm hook depths (W, w), which includes a number of different at least partial contact faces (11, 16, 17, 19, 13, 21, 29) for wiper arm hooks (23, 23.1, 28) with different dimensions, having two housing side walls (2, 3) and a center piece (4) disposed between them, these partial contact faces (11, 16, 17, 19, 13, 21, 29) are disposed on a housing side wall (2, 3) in order to compensate for different wiper arm hook widths (B, b) and are disposed on the center piece (4) in order to compensate for different wiper arm hook depths (W, w), and that the partial contact faces (11, 16, 17, 19, 13, 21, 29) permit a reception of at least two different wiper arm hooks (23, 23.1, 28) along mounting axes (15, 20) that are disposed at angles to each other, at least one film hinge (5, 6) is attached to one of the housing side walls (2) and that a detent projection (7, 8) is provided on the opposite housing side wall (3) and cooperates with the at least one film hinge (5, 6).

8. A connecting element (1) for connecting a windshield wiper blade (21) to wiper arm hooks (23, 23.1, 28) of different wiper arm hook widths (B, b) and wiper arm hook depths (W, w), which includes a number of different at least partial contact faces (11, 16, 17, 19, 13, 21, 29) for wiper arm hooks (23, 23.1, 28) with different dimensions, having two housing side walls (2, 3) and a center piece (4) disposed between them, these partial contact faces (11, 16, 17, 19, 13, 21, 29) are disposed on a housing side wall (2, 3) in order to compensate for different wiper arm hook widths (B, b) and are disposed on the center piece (4) in order to compensate for different wiper arm hook depths (W, w), and that the partial contact faces (11, 16, 17, 19, 13, 21, 29) permit a reception of at least two different wiper arm hooks (23, 23.1, 28) along mounting axes (15, 20) that are disposed at angles to each other, the connecting element can be connected along a first mounting axis (18) to one of a first wiper hook (23) with a first hook width (B) and a first hook depth (W), to a second wiper arm hook (23.1) with the same hook width (B) but with a second hook depth (w) that is reduced in relation to the first hook depth (W), or can be connected along a second mounting axis (20) to a wiper arm hook (28) with the second hook depth (w), but with a reduced hook width (b).

* * * * *